(12) United States Patent
Leu

(10) Patent No.: US 6,234,399 B1
(45) Date of Patent: May 22, 2001

(54) METHOD AND MEANS FOR DETERMINING MALFUNCTIONING OF A THERMOSTATIC VALVE

(75) Inventor: Peter Leu, Ostfildern (DE)

(73) Assignee: Behr Thermotronik GmbH & Co. (DE)

( * ) Notice: Subject to any disclaimer, the term of this patent is extended or adjusted under 35 U.S.C. 154(b) by 0 days.

(21) Appl. No.: 09/502,183

(22) Filed: Feb. 10, 2000

(30) Foreign Application Priority Data

Feb. 12, 1999 (DE) ................................. 199 06 056

(51) Int. Cl.$^7$ ................................. F01P 5/14; G01L 3/26
(52) U.S. Cl. ........................ 236/94; 73/116; 123/41.15; 165/11.1
(58) Field of Search .................... 73/116, 117.3; 236/94, 34.5; 165/11.1, DIG. 7; 123/41.15

(56) References Cited

U.S. PATENT DOCUMENTS

| | | | |
|---|---|---|---|
| 4,069,712 | 1/1978 | Armstrong et al. | 73/118 |
| 4,804,139 | * 2/1989 | Bier | 123/41.15 X |
| 5,467,745 | * 11/1995 | Hollis | 236/34.5 Y |
| 5,526,871 | 6/1996 | Musser et al. | 165/11.1 |

FOREIGN PATENT DOCUMENTS 44 26 494 A 1   7/1994 (DE).
197 55 859 A1   12/1997 (DE).

OTHER PUBLICATIONS

German Search Report dated 27 Dez. 1999 (4 pages).

* cited by examiner

*Primary Examiner*—William Wayner
(74) *Attorney, Agent, or Firm*—Kennedy Covington Lobdell & Hickman, L.L.P.

(57) ABSTRACT

To detect the capability to function of a thermostatic valve of a cooling system of an internal combustion engine of a vehicle, the actual temperature of the internal combustion engine, the ambient temperature and the actual temperature at the outlet of a coolant radiator are measured and evaluated in such a way that a malfunction of the thermostatic valve can be detected thereby.

9 Claims, 4 Drawing Sheets

Fig. 1

| | COLD START | | | DOWNHILL DRIVING | | | | HIGHWAY DRIVING | | | OVERRUN MODE | |
|---|---|---|---|---|---|---|---|---|---|---|---|---|
| $T_{MOT}$ [°C] | -20 | 90 | 107 | 110 | 100 | 92 | 90 | 90 | 108 | 110 | 102 | 100 |
| $T_K$ [°C] | -20 | -20 | 28 | 32 | 24 | 8 | 0 | 40 | 75 | 80 | 70 | 65 |
| $T_U$ [°C] | -20 | -20 | -20 | -20 | -20 | -20 | -20 | 40 | 40 | 40 | 40 | 40 |
| Th-VALVE POSITION | 0 | 0 | 1 | 1 | 0 | 0 | 0 | 0 | 1 | 1 | 0 | 0 |

Fig. 2

| | WARM RUNNING / THERMOSTATIC VALVE JAMMED CLOSED | | | SUDDEN SLOWING OF TRAFFIC / THERMOSTATIC VALVE JAMMED CLOSED | | |
|---|---|---|---|---|---|---|
| $T_{MOT}$ [°C] | 60 | 107 | 115 WARNING | 110 | 115 WARNING | 118 ↕ |
| $T_K$ [°C] | 40 | 40 | 40 | 80 | 65 | 55 |
| $T_U$ [°C] | 40 | 40 | 40 | 40 | 40 | 40 |
| Th-VALVE POSITION | 0 | 0 | 0 | 1 | 0 | 0 |

Fig. 3

| | RUNNING WARM/ THERMOSTATIC VALVE OPEN | | | | SUDDEN SLOWING OF TRAFFIC/ THERMOSTATIC VALVE JAMMED OPEN | | | | |
|---|---|---|---|---|---|---|---|---|---|
| $T_{MOT}$ [°C] | 40 | 50 | 90 | 100 | 115 | 112 | 110 | 90 |
| $T_K$ [°C] | 40 | 50 | 90 | 100 | 95 | 100 | 105 | 90 |
| $T_U$ [°C] | 40 | 40 | 40 | 40 | 40 | 40 | 40 | 40 |
| Th- VALVE POSITION | 0 (1) | 1 | 1 | 1 | 1 | 1 | 1 | 1 |

METHOD AND MEANS FOR DETERMINING MALFUNCTIONING OF A THERMOSTATIC VALVE

FIELD OF THE INVENTION

The invention relates to a method for determining malfunctioning of a thermostatic valve, which determines the division of an amount of coolant exiting an internal combustion engine of a motor vehicle into a portion which moves through a coolant radiator, and a portion returning to the internal combustion engine while bypassing the coolant radiator, and to devices for executing the method.

BACKGROUND OF THE INVENTION

Cooling systems of motor vehicle engines are customarily equipped with a thermostatic valve, which controls the distribution of the amounts of a coolant exiting the internal combustion engine and flowing through a coolant radiator back to the internal combustion engine or, bypassing the coolant radiator, directly through a bypass back into the engine. It is attempted by means of this thermostatic valve to maintain the operating temperature of the internal combustion engine at as constant (high) a temperature as possible after it has warmed up.

Thermostatic valves of this type have achieved a very high standard of quality because of long years of development, so that they fail only rarely. Still, there is the need for monitoring the ability of the thermostatic valve to function.

OBJECT AND SUMMARY OF THE INVENTION

The object of the invention is to determine whether a thermostatic valve is malfunctioning because the valve has not opened or closed as required by engine operating conditions. In accordance with the invention, this is done without intervention with the thermostatic valve and only on the basis of an evaluation of detected temperatures, in particular of those temperatures influenced by the thermostatic valve.

In connection with a first embodiment, the actual temperature of the internal combustion engine and the actual temperature at the outlet of the coolant radiator are measured and combined, and the combinations are compared with stored combinations of these temperatures for detecting a malfunction of the thermostatic valve and for generating a signal representing the malfunction.

The invention proceeds from the realization that the engine temperature and the coolant temperature at the radiator outlet have defined relationships with each other, if the thermostatic valve functions normally. If, however, temperature combinations are detected which could not occur under normal functioning, it is possible to directly deduce from this that a malfunction of the thermostatic valve exists.

In connection with a second embodiment, the actual temperature of the internal combustion engine and the actual temperature at the outlet of the coolant radiator are measured, and states and changes in state of the detected temperatures are combined and compared in order to detect a malfunction of the thermostatic valve from this and to generate a signal representing the malfunction. This attainment, too, proceeds from the realization that certain temperature states or changes in those states cannot occur, if the thermostatic valve operates normally, so that, if these states or changes in states nevertheless do appear, it is possible to deduce a malfunction of the thermostatic valve.

In further development of the invention it is provided that the ambient temperature is detected and is also taken into consideration in the combinations. It is possible to refine the evaluation by means of including the ambient temperature in the measurement and evaluation and possibly to detect not quite unambiguous combinations of temperatures clearly as a malfunction or a normal function.

In a device for executing the first method, a memory is provided for receiving a multitude of combinations of temperatures of the internal combustion engine and temperatures of the coolant at the outlet of the coolant radiator, and preferably also of the ambient temperature, means for detecting the actual temperature of the internal combustion engine and means for detecting the actual temperature of the coolant at the outlet of the coolant radiator, and preferably means for detecting the ambient temperature, means for forming the combinations of the measured temperatures, means for comparing the stored combinations with the combinations of the measured temperatures, and means for producing a signal representing a malfunction of the thermostatic valve.

In a device for executing the second method, means are provided for detecting the actual temperature of the internal combustion engine and means for detecting the actual temperature of the coolant at the outlet of the coolant radiator, and preferably means for detecting the ambient temperature, whose outputs are connected to a logic circuit which, as a function of the states and changes in the states of the detected temperatures generates a signal which represents a possible malfunction of thermostatic valve.

Further characteristics and advantages of the invention ensue from the following description of exemplary embodiments with reference to the accompanying drawings.

BRIEF DESCRIPTION OF THE DRAWINGS

FIG. 1 shows a small portion of a type of a characteristic chart of possible temperature combinations in the normal operation of a coolant circuit of an internal combustion engine of a motor vehicle provided with a thermostatic valve, FIG. 2 represents examples of measured actual values while a thermostatic valve is blocked in the closed state, FIG. 3 represents examples of measured actual values while a thermostatic valve is blocked in the open state.

DETAILED DESCRIPTION OF THE PREFERRED EMBODIMENTS

Figure 4:
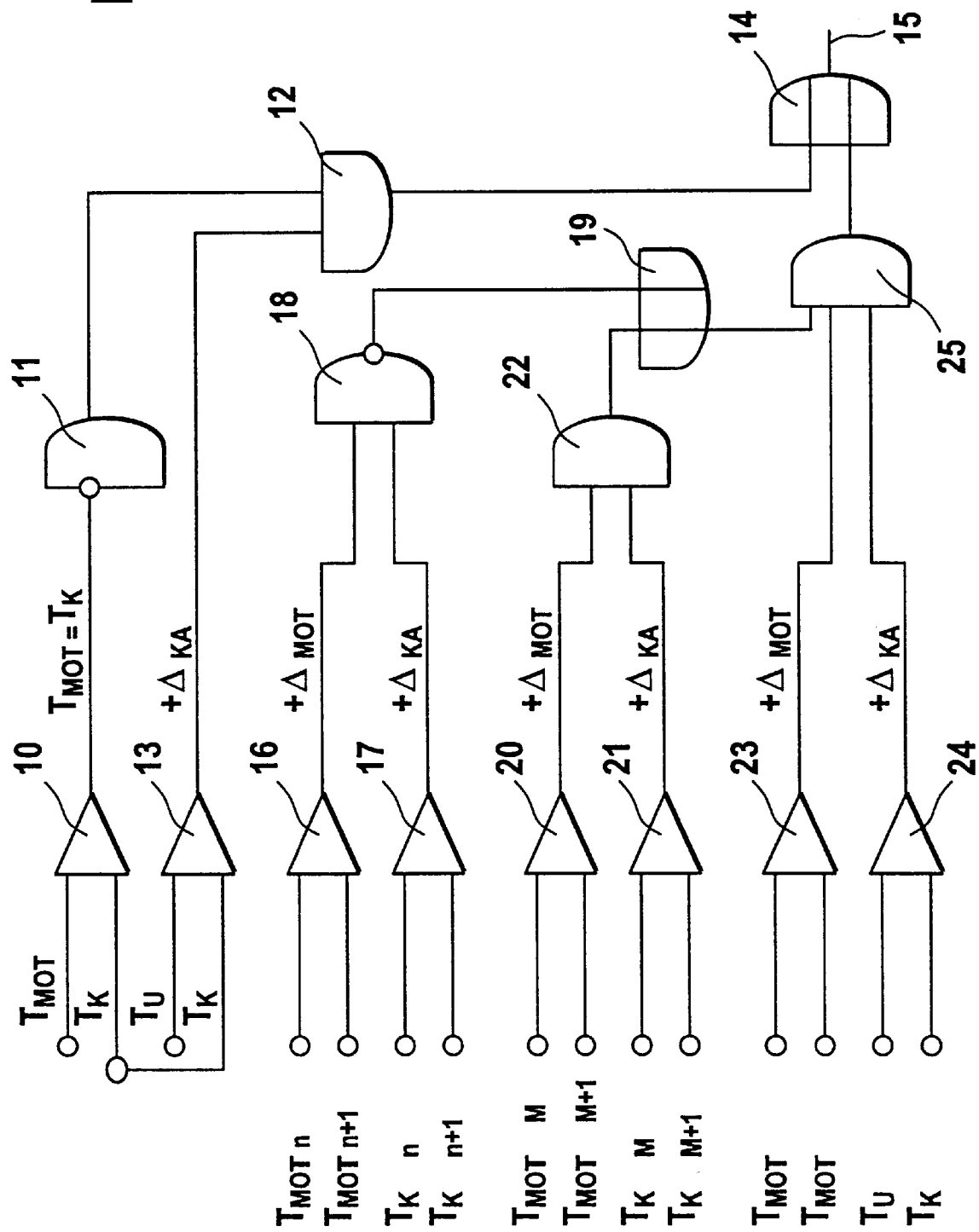
FIG. 4 is a logic circuit diagram for detecting a malfunction of a thermostatic valve.

The temperature $T_{MOT}$ of the internal combustion engine is measured, which can be done by means of a temperature sensor, for example, which measures the coolant temperature inside the internal combustion engine or at the outlet of the internal combustion engine, or by means of a temperature sensor which measures the temperature of a component of the internal combustion engine. This is a measurement which today is customarily performed in every internal combustion engine of a motor vehicle and which can be picked up at the engine control device. Furthermore, the temperature $T_{KAUS}$ at the outlet of the coolant radiator at the inlet to the thermostatic valve is measured. This is a temperature which today is not customarily measured, since it is not used by the engine control. In addition to this, the ambient temperature $T_U$ is also measured, which is in particular measured in the form of the temperature of the aspirated air in the intake of the internal combustion engine. These temperatures have been entered in FIG. 1 for several driving states, wherein the respective associated thermostatic valve position is indicated. Here, 0 indicates the closed position and 1 the opened position.

To the left in FIG. 1, first a start in a very cold ambient temperature is represented, as well as subsequent driving at an ambient temperature $T_U$ remaining low at −20° C. without a change. The thermostatic valve is in the closed position (position 0) during starting, so that the coolant exclusively flows from the engine outlet directly back into the engine inlet while bypassing the coolant radiator. Because of this, the engine is initially quickly heated, while the temperature $T_{K\,AUS}$ at the outlet of the coolant radiator remains unchanged. It is assumed that, if the thermostatic valve is functioning properly, it will open at approximately 100° C., i.e. it at least partially releases the flow of coolant through the coolant radiator. This now also results in a warming of the coolant at the coolant outlet, so that this temperature $T_{K\,AUS}$ at the outlet of the coolant radiator rises to approximately 28° C. If it is assumed that the operating temperature of the internal combustion engine is to be regulated by means of the thermostatic valve at $T_{MOT}$ of 110° C., the temperature $T_{K\,AUS}$ at the outlet of the coolant radiator reaches approximately 32° C. The thermostatic valve is open (position 1) in the range of these temperatures. By means of a comparison of the temperature combinations it is now possible to determine in this range whether or not the thermostatic valve has been opened when the opening temperature was reached. If, at an actual temperature $T_{MOT}$ of 107° C., the temperature $T_{KAUS}$ at the outlet of the coolant radiator should lie considerably below 28° C., while the ambient temperature $T_U$ has not changed, it is possible to draw the conclusion from this that the thermostatic valve has not opened, but remains in its closed position.

If thereafter the vehicle is driven downhill, as also represented in FIG. 1, while the ambient temperature $T_U$ remains low, the engine temperature $T_{MOT}$ and the temperature $T_{K\,AUS}$ at the outlet of the radiator drop, while the thermostatic valve switches back into its closed position. Since in this case coolant no longer flows through the coolant radiator, the temperature $T_{KAUS}$ at the outlet of the coolant radiator drops relatively quickly. It is also possible here to determine whether the thermostatic valve has switched to the closed position (position 0). If, for example, an increased temperature $T_{K\,AUS}$ remains, although the engine temperature $T_{MOT}$ drops, this is an indication that the thermostatic valve has not closed, but remains in the open position.

Additional temperature combinations during highway driving are shown in FIG. 1, wherein the vehicle has started out in a warmed-up state, i.e. at an engine temperature $T_{MOT}$ of 90° C., a temperature $T_{KAUS}$ of 40° C. at the outlet of the coolant radiator and an ambient temperature $T_U$ of also 40° C. at the air intake. In this case the thermostatic valve regulates the temperature to an operating temperature $T_{MOT}$ of 110° C., for example. The thermostatic valve has opened at 102° C., for example, so that in this case the temperature $T_{K\,AUS}$ at the outlet of the coolant radiator has also risen. If the vehicle is then operated in the overrun mode because of downhill driving, the motor temperature $T_{MOT}$, as well as the temperature $T_{K\,AUS}$ of the coolant at the outlet of the coolant radiator, drop. Here, too, it is possible by means of a comparison of the temperature combinations to determine whether the thermostatic valve is capable of functioning, or is blocked in its opened or closed state.

Examples of the combinations of temperatures if the thermostatic valve is blocked in the closed state during the warm-up phase or during normal driving (highway driving) are represented in the form of a table in FIG. 2. Should the thermostatic valve already have been blocked during the warm-up phase, only the temperature $T_{MOT}$ of the internal combustion engine increases, while the temperature $T_{K\,AUS}$ of the coolant at the outlet of the coolant radiator remains at a (constant) low value. If in this case the ambient temperature $T_U$ also remains constant, the temperature $T_{K\,AUS}$, which remains constant while the temperature $T_{MOT}$ increases, is a clear indication that the thermostatic valve has not opened. If in case of highway driving, as represented at the right in FIG. 2, the thermostatic valve should become jammed or blocked in the closed position after a regulating action, this can also be determined by means of the combination of temperatures. If the thermostatic valve has regulated the engine to an operating temperature $T_{MOT}$ of 110° C., the temperature $T_{K\,AUS}$ at the outlet of the coolant radiator is for example 80° C. But if, however, the engine temperature $T_{MOT}$ rises, while the temperature $T_{K\,AUS}$ at the outlet of the coolant radiator drops, this is a clear indication that the thermostatic valve has not opened again after a regulating action. Since, with the thermostatic valve blocked in the closed position, there is the danger of overheating of the internal combustion engine and therefore the danger of its destruction, a warning signal is issued starting at a temperature $T_{MOT}$ of 115° C. of the internal combustion engine.

Examples of temperature combinations when the thermostatic valve is blocked in the open state are represented in FIG. 3. If the thermostatic valve was already blocked during the warm-up phase, the internal combustion engine is heated in the same way and equally with the coolant flowing through the coolant radiator, i.e. the temperature $T_{MOT}$ of the internal combustion engine and the temperature $T_{K\,AUS}$ at the outlet of the coolant radiator are essentially equal and also proceed essentially the same. As long as the ambient temperature $T_U$ does not change, this is also a sure sign of a thermostatic valve blocked in the open state.

If in the course of highway travel the thermostatic valve should become blocked in the open position following a regulating action, the temperature $T_{MOT}$ of the internal combustion engine drops, while the temperature $T_{K\,AUS}$ at the outlet of the coolant radiator rises, until both arrive at approximately the same temperature, as long as the ambient temperature $T_U$ does not change. This, too, is a clear sign of a thermostatic valve blocked in the open state.

The danger of overheating does not exist if the thermostatic valve is blocked in the open position. Therefore it is not absolutely necessary to issue a warning signal calling the attention of the user of the vehicle to this danger. In this case it is sufficient if a signal is generated which, for example, indicates the need for maintenance.

As has been explained above, defined combinations of the temperature $T_{MOT}$ of the internal combustion engine, the temperature $T_{K\,AUS}$ at the outlet of the coolant radiator, and of the ambient temperature $T_U$, are associated with the normal operation with the thermostatic valve capable of functioning. These can be stored in a type of characteristic diagram. If then the actual temperatures are measured, and their combinations are compared with the stored combinations of temperatures, it can be respectively determined in a simple manner whether the thermostatic valve is capable of functioning or is blocked in the opened or closed position. In the course of this it is then possible, depending on this determination, to generate a signal representing the respective blocked position.

In the same way it is also possible to deposit the temperature combinations which correspond to combinations occurring when the thermostatic valve is blocked in the open position or the closed position, in a sort of a characteristic diagram. In this case an appropriate signal is triggered when the occurrence of these combinations is detected, which indicates whether the thermostatic valve is blocked in the open or closed position.

As had already been explained in what was said above, it is also possible to detect a malfunction of the thermostatic valve as a result of the temperature states or changes of the temperature states, since these are very different when the thermostatic valve operates normally or is blocked in one position.

If, with the ambient temperature $T_U$ unchanged, the engine temperature $T_{MOT}$ and the temperature $T_{K\_AUS}$ change in opposite directions, this is an indication of a malfunction of the thermostatic valve. If the engine temperature $T_{MOT}$ rises and the temperature $T_{KAUS}$ at the outlet of the coolant radiator drops or remains constant, it can be deduced that the thermostatic valve is blocked in the closed position. If, however, the engine temperature $T_{MOT}$ drops and the temperature $T_{K\_AUS}$ at the outlet of the coolant radiator rises, it can be deduced that the thermostatic valve is blocked in the open position. If, moreover, the engine temperature $T_{MOT}$ and the temperature $T_{KAUS}$ are equal, also with the ambient temperature being constant, and change in the same direction, a malfunction of the thermostatic valve can be deduced, in which the thermostatic valve is blocked in the open position.

The detection of a malfunction is possible, for example, by means of the logic circuit represented in FIG. 4. A comparator 10 compares the actual temperature $T_{MOT}$ of the internal combustion engine with the temperature $T_{K\_AUS}$ at the outlet of the coolant radiator. If these two temperatures are the same, they are passed on by a negating element 11 to an AND element 12. A further comparator 13 compares the ambient temperature $T_U$ with the temperature $T_{KAUS}$ and sends a signal to the second input of the AND element 12. The output of the AND element is connected with the input of an OR element 14. If the inputs to the ADD element are different, the ADD element 12 passes a signal to the OR element, which issues a signal 15 indicating that the thermostatic valve is in an open malfunctioning condition.

A comparator 16 compares the engine temperatures $T_{MOTn}$ and $T_{MOTn+1}$ at two successive times and sends its signal to the input of an AND element 18, whose output is negated. The output of a comparator 17, which compares the temperature $T_{K\_AUSn}$ and $T_{K\_AUSn+1}$ at the outlet of the coolant radiator at two successive times, is connected to the second input of the AND element 18 and sends a signal to the AND element 18 when there is a positive difference. The output of an AND element 22, to whose input a comparator 20 and a comparator 21 are connected, is connected to the second input of the OR element 19, to whose one input the negated output of the AND element 18 is connected. The comparator 20 compares the engine temperature $T_{MOT\_M+1}$ of successive points in time and, with a positive difference, sends a signal to the AND element 22. The comparator 21 compares the temperature $T_{K\_AUS\_M}$ and $T_{K\_AUS\_M+1}$ of successive points in time and in case of a positive difference, also sends a signal to the input of the AND element 22.

The output of the OR element 19 is connected to an input of an AND element 25, whose output is connected to the second input of the OR element 14. The outputs of a comparator 23, which compares the set value $T_{MOT\_SOLL}$ with the actual temperature $T_{MOT\_IST}$, is connected to the triple AND element 25. A comparator 24 is connected to the third input of the AND element, which compares the ambient temperature $T_U$ with the actual temperature $T_{K\_AUS}$.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a fill and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for determining malfunctioning of a thermostatic valve, which determines the division of an amount of coolant exiting an internal combustion engine into a portion which moves through a coolant radiator, and a portion returning to the internal combustion engine while bypassing the coolant radiator, comprising: measuring the actual temperature of the internal combustion engine and the actual temperature at the outlet of the coolant radiator and combining said measurements with each other, comparing the combinations with stored combinations of these temperatures to determine a malfunction of the thermostatic valve, and generating a signal representing the malfunction.

2. A method according to claim 1, characterized further in that respectively different signals are generated for representing a malfunction when the thermostatic valve remains in an opened position or in a closed position.

3. A method for determining malfunctioning of a thermostatic valve, which determines the division of an amount of coolant exiting an internal combustion engine into a portion which moves through a coolant radiator, and a portion returning to the internal combustion engine while bypassing the coolant radiator, comprising measuring the actual temperature of the internal combustion engine and the actual temperature at the outlet of the coolant radiator to determine changes thereof and combining said measurements and changes of the detected temperatures with each other, comparing the combinations to determine a malfunction of the thermostatic valve from this, and generating a signal representing the malfunction.

4. A method according to claim 3, characterized further in that the ambient temperature is detected and related to the combinations in determining a malfunction.

5. A method according to claim 3, characterized further in that respectively different signals are generated for representing a malfunction when the thermostatic valve remains in an opened position or in a closed position.

6. Means for determining malfunctioning of a thermostatic valve, which determines the division of an amount of coolant exiting an internal combustion engine into a portion which moves through a coolant radiator, and a portion returning to the internal combustion engine while bypassing the coolant radiator, said means comprising: means for measuring the actual temperature of the internal combustion engine, means for measuring the actual temperature of the coolant at the outlet of the coolant radiator, means for forming the combinations of the measured temperatures, means for comparing stored combinations with the combinations of the measured temperatures to determine malfunction of the thermostatic valve based on said comparing, and means responsive to said comparing means for producing a signal representing a malfunction of the thermostatic valve.

7. Means according to claim 6, characterized further by means for detecting the ambient temperature and by said logic circuit being connected thereto for inclusion of the state and changes in state of the measured ambient temperature by said comparing means in determining a malfunction in the signal generating function.

8. Means for determining malfunctioning of a thermostatic valve, which determines the division of an amount of coolant exiting an internal combustion engine into a portion which moves through a coolant radiator, and a portion returning to the internal combustion engine while bypassing the coolant radiator, said means comprising: means for measuring the actual temperature of the internal combustion engine, means for measuring the actual temperature of the coolant at the outlet of the coolant radiator, a logic circuit connected to said engine and coolant measuring means for generating as a function of the states and changes in the states of the measured temperatures a signal representing a possible malfunction of the thermostatic valve.

9. Means according to claim 8, characterized further by means for detecting the ambient temperature and by said logic circuit being connected thereto for inclusion of the state and changes in state of the measured ambient temperature by said comparing means in determining a malfunction in the signal generating function.

\* \* \* \* \*